United States Patent
Bourgeois et al.

[19]

[11] Patent Number: 6,108,534
[45] Date of Patent: Aug. 22, 2000

[54] DATA AND MESSAGE RETRIEVAL COMMUNICATIONS SYSTEM INCLUDING REMOTE RECEIVE-ONLY COMMUNICATION UNIT

[75] Inventors: Troy M. Bourgeois, Apex; Carlos E. Vidales, Raleigh, both of N.C.; Jacobus C. Haartsen, Staffanstorp, Sweden; Lars B Nord, Lund, Sweden; Heino Wendelrup, Malmo, Sweden

[73] Assignee: Ericsson Inc., Research Triangle Park, N.C.

[21] Appl. No.: 08/941,241

[22] Filed: Sep. 30, 1997

Related U.S. Application Data

[60] Provisional application No. 60/027,114, Sep. 30, 1996.

[51] Int. Cl.[7] .............................. H04M 3/00; G08B 5/22
[52] U.S. Cl. .......................... 455/419; 455/412; 455/39; 340/825.44
[58] Field of Search ................................... 455/412, 418, 455/419, 420, 66, 68, 70, 344, 352, 39, 31.1; 340/825.44

[56] References Cited

U.S. PATENT DOCUMENTS

| | | | |
|---|---|---|---|
| 4,447,872 | 5/1984 | Nothaft | 364/200 |
| 4,879,758 | 11/1989 | DeLuca et al. | 455/296 |
| 5,182,553 | 1/1993 | Kung | 340/825.44 |
| 5,418,528 | 5/1995 | Hosack et al. | 340/825.44 |
| 5,422,934 | 6/1995 | Massa . | |
| 5,440,559 | 8/1995 | Gaskill | 370/314 |
| 5,479,408 | 12/1995 | Will | 370/313 |
| 5,488,359 | 1/1996 | Faris et al. | 340/825.44 |
| 5,606,739 | 2/1997 | Goto | 340/825.44 |
| 5,757,277 | 5/1998 | Kobayashi | 340/825.44 |
| 5,802,460 | 9/1998 | Parvulescu et al. | 455/419 |
| 5,835,569 | 11/1998 | Ajiro | 455/412 |
| 5,838,252 | 11/1998 | Kikinis | 340/825.44 |
| 5,872,926 | 2/1999 | Levac et al. | 340/825.44 |
| 5,930,729 | 7/1999 | Khamis et al. . | |

FOREIGN PATENT DOCUMENTS

| | | | |
|---|---|---|---|
| 0 382 035 | 8/1990 | European Pat. Off. | 455/31.1 |
| 0 691 777 | 1/1996 | European Pat. Off. | 455/414 |
| WO 86 03318 | 6/1986 | WIPO | 340/825.44 |

Primary Examiner—William G. Trost
Assistant Examiner—Erika A. Gary
Attorney, Agent, or Firm—Nixon & Vanderhye P.C.

[57] ABSTRACT

A data and message retrieval communications system utilizes a base station such as a PC or cellular phone to transmit received messages and stored data in accordance with an operator customized data configuration and transmission scheme. The system includes a remote receive-only communication unit that receives and processes the signal from the base station in accordance with an operator customized data configuration and retrieval scheme. The remote unit preferably includes a receiver having an antenna, a processor that processes the transmission signal received by the receiver, a memory storing the personal data and data corresponding to the transmission signal, and a display interface unit enabling an operator to interface with the processor programmed to access and control the receiver, the memory and the display interface in accordance with the operator customized data configuration and retrieval scheme. In one arrangement, the remote communication unit is embodied in a wristwatch for maximum portability.

33 Claims, 9 Drawing Sheets

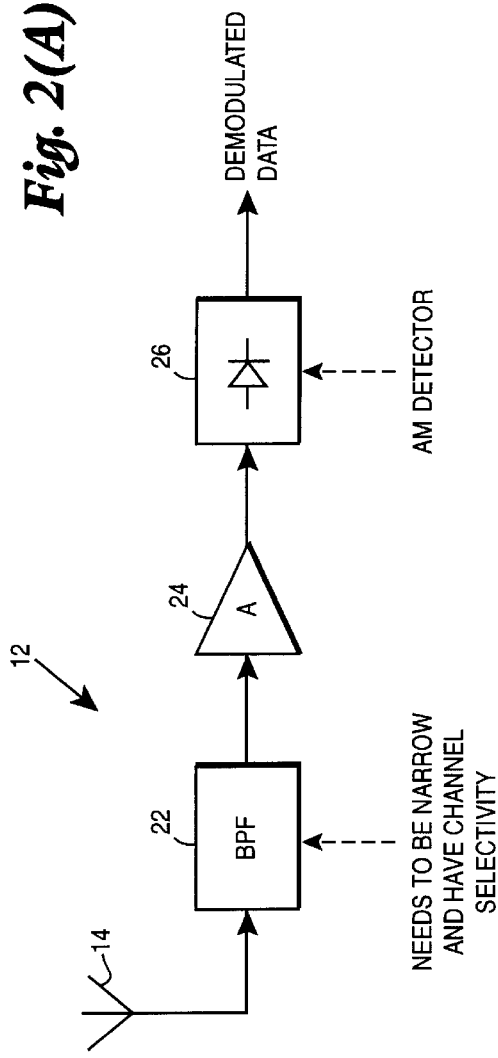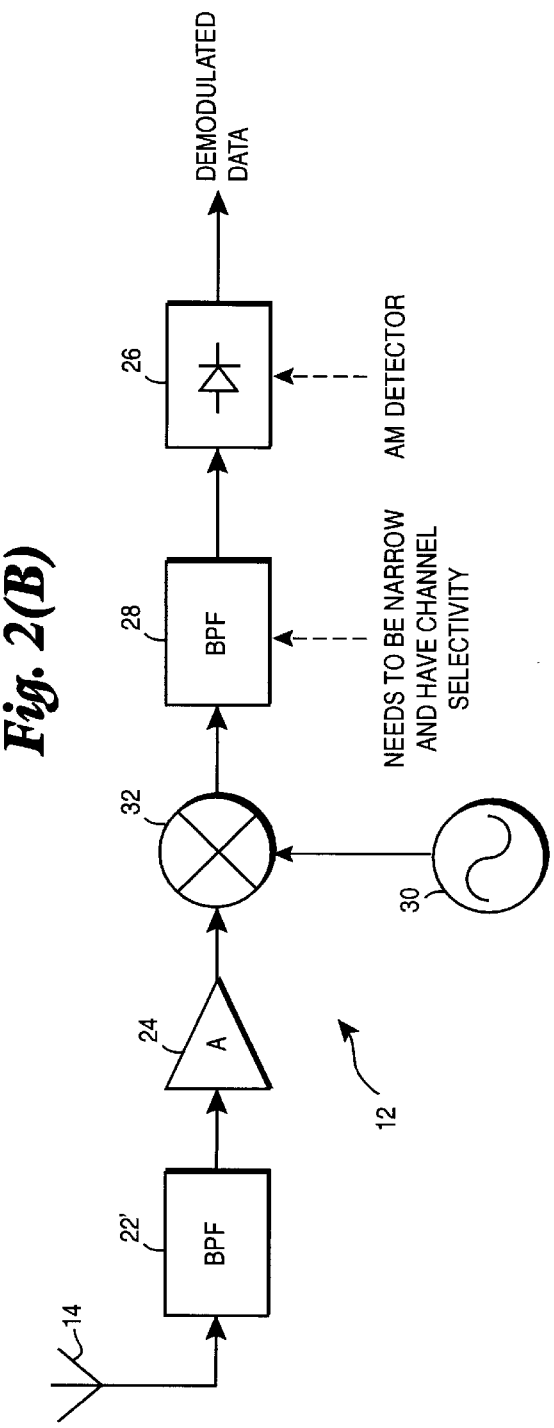

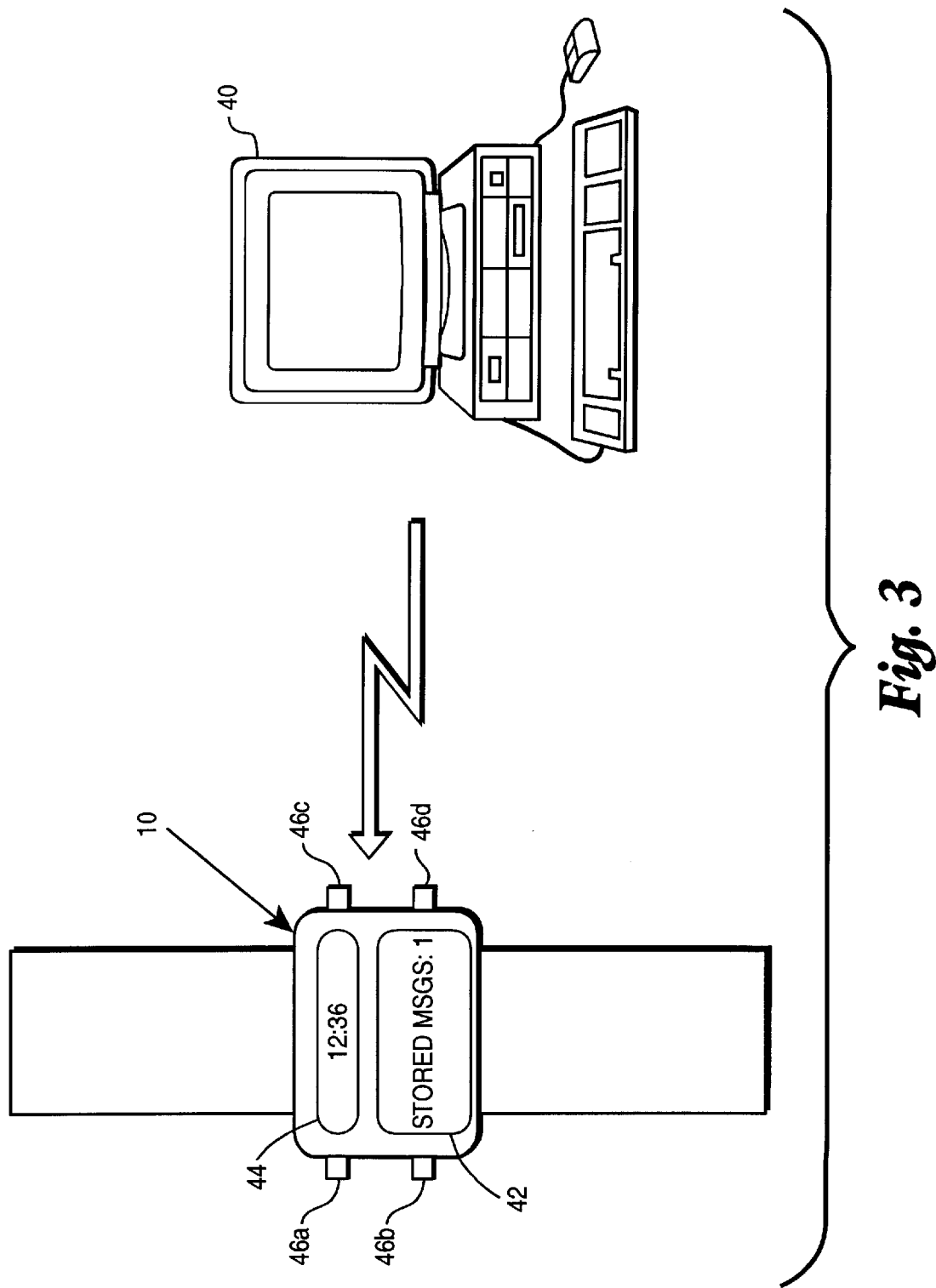

DATA AND MESSAGE RETRIEVAL COMMUNICATIONS SYSTEM INCLUDING REMOTE RECEIVE-ONLY COMMUNICATION UNIT

This application claims the benefit of U.S. Provisional Application Ser. No. 60/027,144, filed Sep. 30, 1996.

BACKGROUND OF THE INVENTION

The present invention relates to electronic devices for data communication and, more particularly, to a data and message retrieval communication system including a remote receive-only communication unit capable of receiving and processing RF signals and capable of receiving, storing and displaying electronic messages and personal data.

The number of ways to transmit messages from one person to another is expanding rapidly. A person may be contacted by means of a telephone, e-mail, voice mail, facsimile, cellular (radio) and pager, to name a few of the more common methods. Other methods of communication are under development, and the number of ways that a person may be contacted will only increase in the future. Not only is it now easier to send messages, it is also easier to send longer messages containing text and other information as memory capacity is increased while reducing component size and the cost of data transmission.

As a result of this communications explosion, people are receiving more messages and more information than ever before. It is imperative to organize and deal with the information as it is received: e-mail messages must be read, voice mail messages must be listened to and responded to, and schedules must be maintained. At the same time, more people are working away from their offices and away from their office support systems. Telecommuting is becoming a popular option for workers in crowded cities and many businesses are closing branch offices and requiring their sales persons to work from home or on the road.

There is an acute need for today's businesspeople to have access to tools and accessories that help them receive and keep track of information and messages received while they are away from the office. The tools must be capable of receiving and organizing information and conveniently providing the information to the user on demand and in a format appropriate to the message. Moreover, the tools must be dynamic and flexible, allowing the user to easily reconfigure them as needs change.

In addition, some users require the ability to retrieve messages at any time under any conditions. For example, construction managers, architects and field engineers may need to receive or review messages outdoors during rain or other adverse weather conditions under which it would be undesirable to use a personal computer or radiotelephone. Moreover, some users have a need to keep certain information available at all times, regardless of their location.

Existing technology includes radio pagers and watches having storage capabilities. Although some pagers have the capability to receive digital and/or text messages, they typically may only be used with a central paging network and may not be reconfigured by the user. Moreover, conventional pagers cannot be used to store messages such as SMS messages and voice mail. (SMS messages are text messages received by a cellular telephone in a GSM system. Appropriately equipped cellular telephones can receive and display SMS messages.) A wristwatch is an ideal device to store important information since wristwatches are worn continuously and may be made shock and water resistant.

Some existing wristwatches include personal information management functions that store phone numbers, dates and other information. These devices, however, are typically programmed by holding them in close proximity to a computer monitor while the monitor displays a bar code pattern, which is unacceptable for many users, since it means that they must be near a computer to program their watches. The user must also take the time to program the watch, rather than having the computer update the watch's memory automatically. Also, such watches are typically not equipped to receive, store and display other types of messages such as text, SMS and voice mail.

SUMMARY OF THE INVENTION

There is thus a need for a wristwatch or like remote communication unit that is capable of receiving, storing and displaying information transmitted over RF channels. The watch has no transmit capability, and is thus referred to as a receive-only watch (ROW) (receive-only communication unit). The communication unit may take other forms as well, such as a ring, clothing, credit card, eye glasses, etc. The absence of a transmitter produces less heat in the device and saves space, power consumption and costs. It is an object of the invention to provide the remote receive-only communication unit operating in cooperation with a data and message retrieval communication system that operates as an extension of a user's personal message storage and retrieval scheme. The data and message retrieval communication system enlists the user's primary message center such as the user's cellular phone, PC, voice mail box, etc., as the system base station. The base station transmits the data to the remote receive-only communication unit in accordance with predetermined operator customized parameters.

In accordance with one particular aspect of the invention, there is provided a remote receive-only communication unit for storing and receiving personal data. The unit includes a receiver having an antenna, a processor communicating with the receiver and processing a transmission received by the receiver, a memory communicating with the processor and storing the personal data, and a display interface unit communicating with the processor. The memory stores a control program and data corresponding to the transmission signal received by the receiver. The control program controls an operation of the processor. The display interface unit includes at least one user interface element that enables an operator to interface with the processor, wherein the processor is programmed to access and control the receiver, the memory and the display interface in accordance with an operator customized data configuration and retrieval scheme. The display interface unit further includes a display that selectively displays at least one of the personal data and the data corresponding to the transmission signal in accordance with the operator customized data configuration and retrieval scheme.

In accordance with another aspect of the invention, there is provided a method of operating a remote receive-only communication unit. The method includes the steps of receiving a transmission signal from a base station, processing the transmission signal in accordance with an operator customized data configuration and retrieval scheme, storing the processed transmission signal into memory in accordance with the scheme, and accessing and controlling the receiver, the memory and the display interface in accordance with the scheme.

In accordance with still another aspect of the invention, there is provided a data and message retrieval communications system including a base station having a transmitter that transmits a transmission signal and the remote receive only communication unit according to the invention. In yet another aspect of the invention, there is provided a method of operating the data and message retrieval communication system.

BRIEF DESCRIPTION OF THE DRAWINGS

These and other aspects and advantages of the present invention will be described in detail with reference to the accompanying drawings, in which:

FIGS. 2(a) and 2(b) are schematic illustrations of the remote receive-only communication unit according to the invention illustrating the components of the unit;

FIG. 3 illustrates an application of the remote receive-only communication unit in the form of a wristwatch receiving a message from the base station;

DETAILED DESCRIPTION OF PREFERRED EMBODIMENTS

Figure 1:
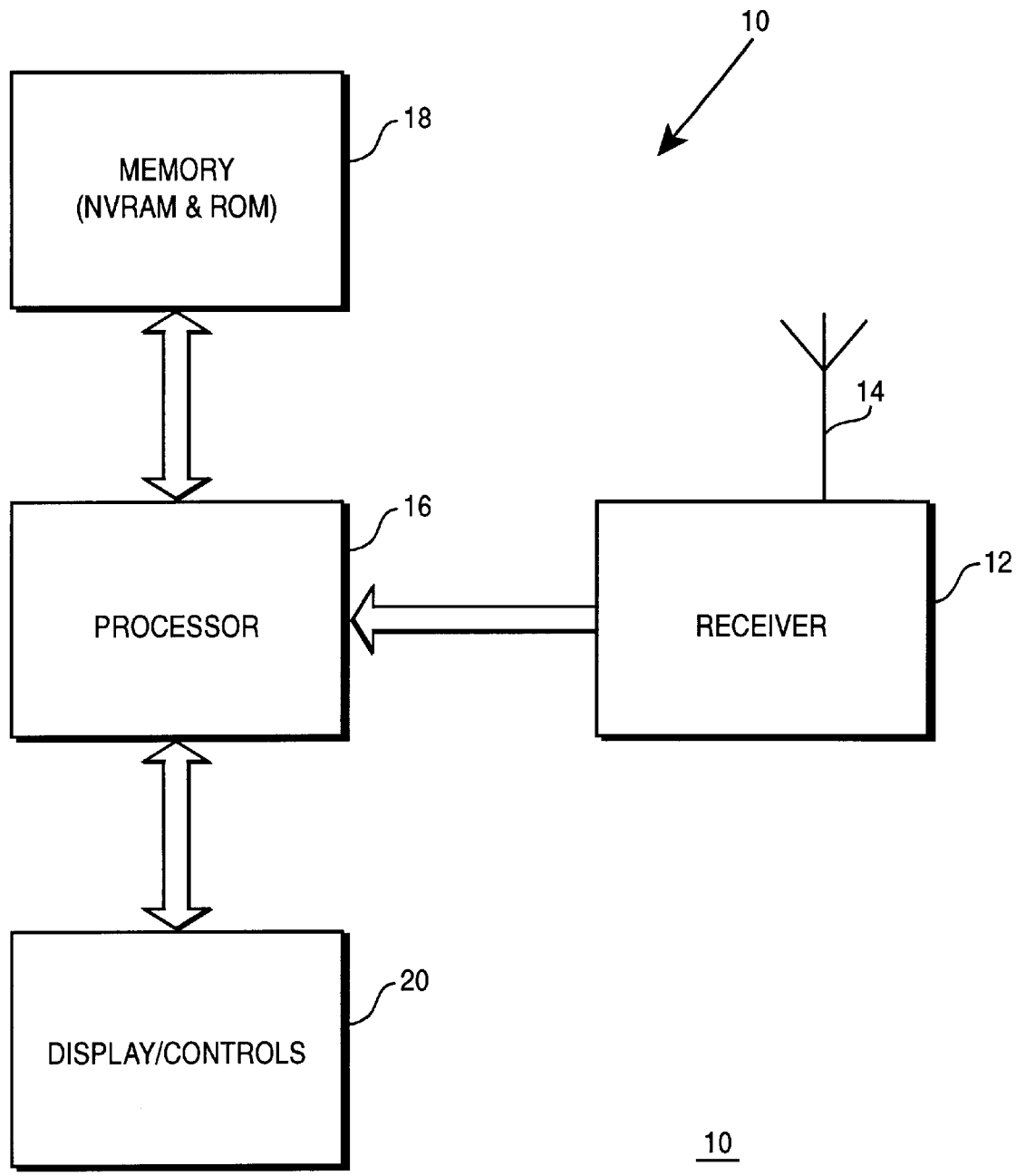
FIG. 1 is a block diagram of the remote receive-only communication unit according to the present invention.
Figure 4:
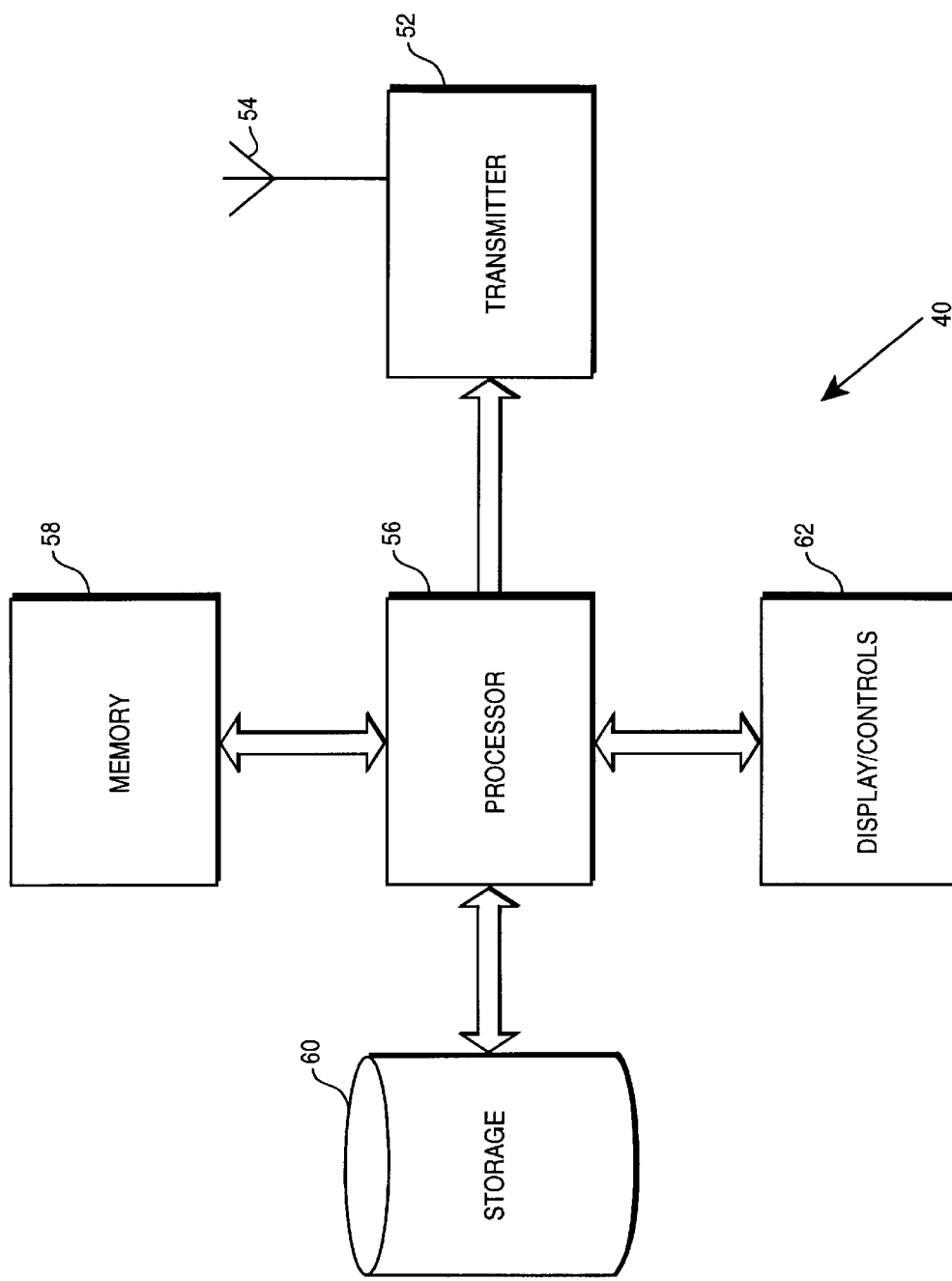
FIG. 4 is a block diagram of the base station according to the present invention.

Referring to FIG. 1, the remote receive-only communication unit 10 according to the present invention includes a receiver 12 having an antenna 14, a processor 16, a memory 18 and a display/control unit 20. The receiver 12 illustrated in FIGS. 2(a) and 2(b) is a conventional RF receiver that is tuned to receive RF transmissions at an appropriate frequency (discussed below). The receiver 12 is used to establish a wireless link to a base station (FIG. 4). Although the receiver 12 shown in the illustrated embodiment is an RF receiver, it could be implemented as an infrared receiver. The antenna 14 preferably comprises a microstrip antenna.

The processor 16 is a conventional microprocessor. The memory 18 comprises a block of read-only memory (ROM) and a block of erasable/rewritable non-volatile memory (NVM). The NVM may comprise a non-volatile random access memory (NVRAM) or it may comprise an EEPROM/ROM or a low-power, battery-operated SRAM such as is typically used in small portable devices. Control of the processor 16 is accomplished by means of a program stored in the memory, preferably in the ROM or EEPROM.

The display/control unit 20 includes an LCD or similar display. The display/control unit preferably also includes a keypad or buttons, an alarm generator, and other user interface elements.

Referring to FIG. 2(a), the receiver 12 according to the invention includes a band pass filter 22, a low-noise amplifier 24, and a simple AM detector 26. When a modulated input signal is picked up by the antenna 14, the signal is band pass filtered by the band pass filter 22 and amplified by the low-noise amplifier 24. The AM detector 26 detects the signal. Preferably, the band pass filter 22 is narrow so that mainly the useful signal is forwarded (i.e., the filter requires high Q—high gain within the narrow RF band of interest).

FIG. 2(b) illustrates an alternative arrangement for the receiver as a heterodyne receiver according to the invention. In this arrangement, the receiver 12 includes the antenna 14, a modified band pass filter 22', the amplifier 24 and the AM detector 26. A second band pass filter 28 along with a local oscillator 30 and a mixer 32 are also provided. In this context, after the modulated signal is picked up by the antenna 14, the signal is band pass filtered by filter 22'. This filter 22', however, is much wider than the filter 22 in the FIG. 2(a) arrangement. The filter 22' will filter out a wide frequency band, with its main purpose being of rejecting and/or blocking most of the undesired signal near the RF band of interest. The signal is then amplified by the amplifier 24, and the signal is mixed with the local oscillator 30 and the output from the mixer 32 is a modulated intermediate frequency (IF). The IF signal is then band pass filtered by the second filter 28, which is narrower than the first filter 22' and is preferably a channel filter. The IF signal is then AM demodulated via the AM detector 26.

The local oscillator 30 could be on the same frequency as the modulated radio frequency (RF) signal. If so, an A/D converter could be inserted between the mixer 32 and the second band pass filter 28 such that the second band pass filter 28 and the detector 26 could be digital implemented.

In the case of a frequency modulation base station, the FM receiver will have the same components as the AM receiver illustrated in FIGS. 2(a) and 2(b) except that the AM detector is replaced by an FM discriminator.

FIG. 3 illustrates one application of the remote receive-only communication unit according to the invention. In FIG. 3, the unit is embodied in a wristwatch and is illustrated receiving messages from a PC type base station 40. In this application, the wristwatch includes a message display area 42, a time display area 44, and user interface buttons 46a, 46b, 46c and 46d.

As shown in FIG. 4, the base station 40 includes an RF transmitter 52 having an antenna 54. The base station 40 also includes a processor 56, a memory 58, a storage unit 60 and a display/control unit 62. As noted above, as an alternative to the PC-type implementation of the base station 40, the base station 40 may be implemented in a cellular radio telephone. Control of the base station 40 is accomplished by means of a program stored in the memory 58. The base station 40 may also include a transceiver (not shown) for connecting to a GSM cellular system to receive SMS messages. Messages to be transmitted to the remote receive-only communication unit 10 are initially stored in the storage unit 60, which in the preferred embodiment is a disk drive or an EEPROM inside the cellular phone. When transmission is to occur, the messages are retrieved from the storage unit 60, or formatted according to customized user-defined parameters, and transmitted over the transmitter 52 to the remote receive-only communication unit 10.

Figure 5A:
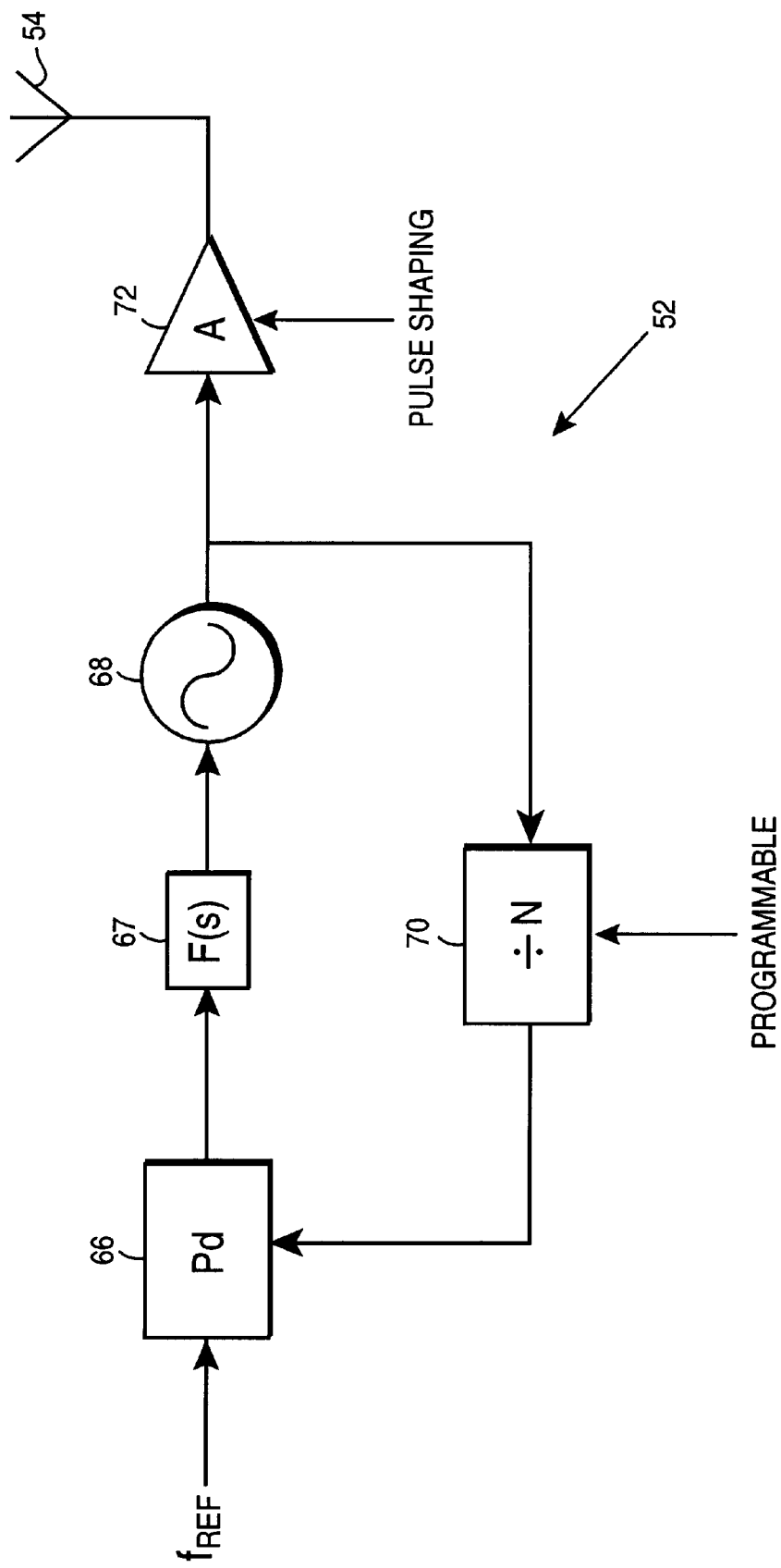
FIGS. 5(a) and 5(b) are schematic illustrations of the base station according to the invention illustrating the components of the base station.
Figure 5B:
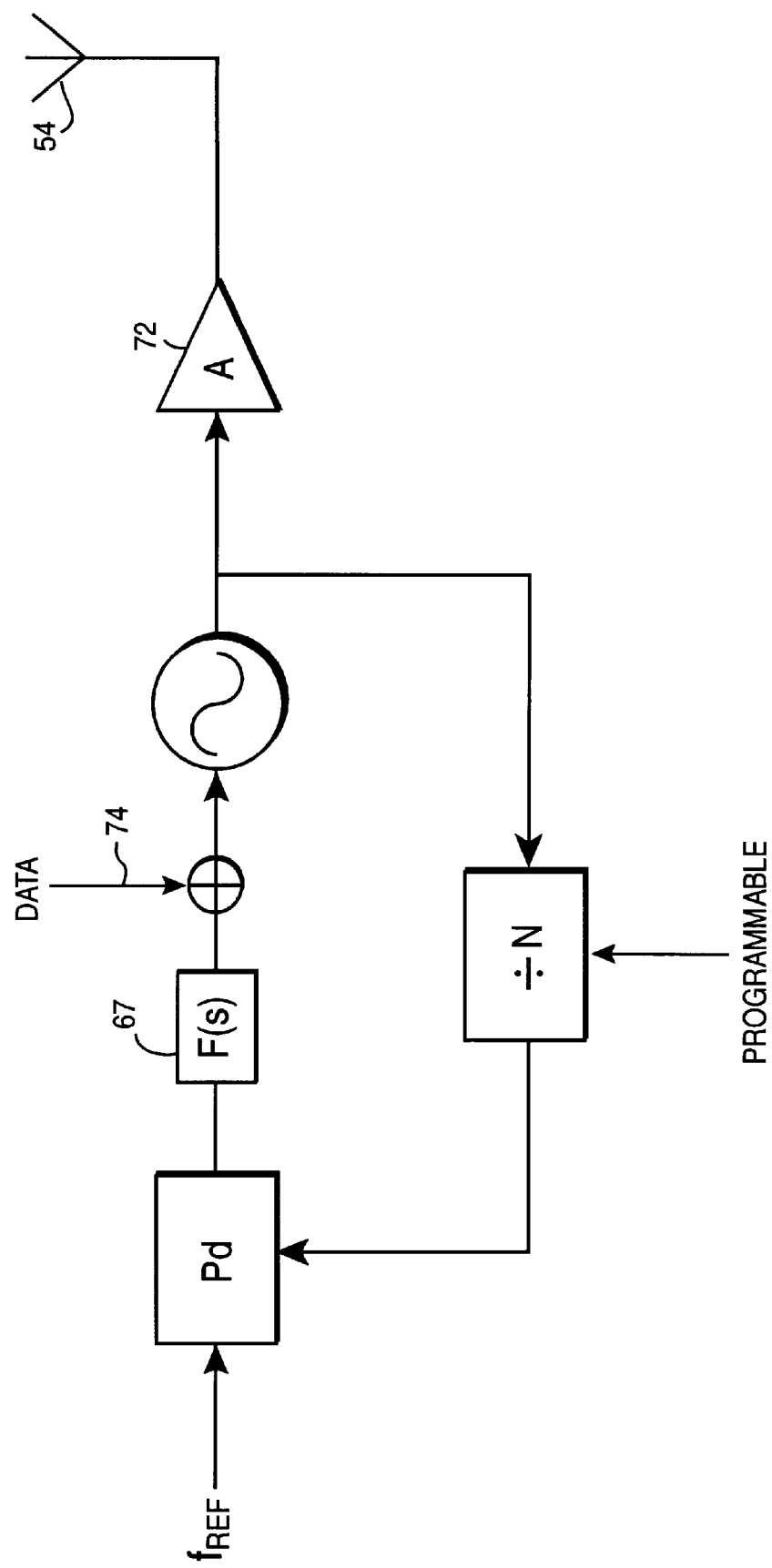

FIGS. 5(a) and 5(b) are schematic illustrations of the transmitter structure according to the present invention. The structure of the transmitter 40 is conventional, and details thereof will not be provided. The frequency generation part of the transmitter in the base station can be designed either with a synthesizer and voltage controlled oscillator (VCO) or a fixed oscillator transmitting on only one frequency. The FIG. 5(a) arrangement utilizes the synthesizer and VCO. A phase detector 66 is fed with a reference frequency derived from a crystal oscillator (not shown). The phase detector 66 controls the VCO 68 via a loop filter 67. The output frequency from the VCO 68 is divided N times by a prescaler 70. N is a function of desired output frequency with respect to the input frequency such that ($f_{out}=N \cdot f_{ref}$). In the present case, N 1/H The output from the prescaler 70 is compared with the reference frequency in the phase detector 66. If the frequencies are not equal, the loop will regulate the VCO 68 so that they become equal. The prescaler 70 is programmable, which allows the transmitter to transmit on many different frequencies. For the fixed oscillator version of the phase detector 66, the loop filter 67 and the prescaler 68 are removed. The VCO is replaced by an oscillator, which is much more frequency accurate. The oscillator could be a crystal oscillator or an oscillator with a surface acoustic wave (SAW) resonator.

Modulation is typically simple using ON/OFF or "1"/"0" or another modulation scheme. The modulated signal could contain more information using, e.g., PPM (pulse position modulation) or PWM (pulse width modulation). The modulation is performed on an amplifier 72 after the oscillator 68 and is performed by a pulse shaping signal giving modulation flexibility.

As shown in FIG. 5(*b*), frequency modulation in the frequency modulation embodiment of the invention uses the same technique as described with respect to the amplitude modulation embodiment described in connection with FIG. 5(*a*). In this arrangement, however, the modulation is superposed 74 on the loop filter 67 output. The loop can either be closed or opened when the modulation signal is superposed. The modulated signal is then amplified by the amplifier 72 before the antenna 54.

Transmission from the base station 40 to the remote receive-only communication unit 10 is performed using a suitable digital transmission protocol supporting multiple receive addresses. Each remote communication unit 10 is assigned a unique address. Thus, a single base station 40 can communicate with multiple remote units 10. When a remote unit 10 receives an incoming transmission, it compares the address specified in the transmission signal with its address. If the addresses match, the remote unit 10 receives and processes the signal. If the addresses do not match, the remote unit 10 ignores the signal. In one arrangement, transmitted signals may be digitally encrypted to prevent an unauthorized remote unit from processing the transmitted signal. An example of a suitable protocol is available from Ericsson, Inc.

The operating range of the base station transmitter is preferably about 10 meters; however, it would be recognized by those skilled in the art that base station transmitters having significantly longer operating ranges could be employed. The base station 40 transmits to the remote unit 10 within an unregulated frequency band such as 902 MHz or 2.4 GHz. The 2.4 GHz band is preferable since transmitter/receiver pairs may communicate in that band by means of physically small antennas. Although the 2.4 GHz band is preferable, other frequency ranges could be used without departing from the scope of the present invention. If infrared transmission is used, the frequency can be as low as a few kHz.

The user may designate, through the base station control interface 52 the priority of messages to be transmitted. For example, the user may stipulate that the base station transmit all SMS messages first and voice messages second. Alternatively, the user may specify that only the first few seconds of any voice message be transmitted. This parameter would save on memory space since digitized voice messages require a large amount of storage. Storage requirements may be eased somewhat by performing conventional voice compression on the data.

All information transmitted to the remote unit 10 is transmitted as digitally encoded information. This allows for easy implementation of conventional forward error correction (FEC) techniques. In a preferred arrangement, the remote unit 10 employs FEC techniques to ensure the accuracy of transmitted information. Since the remote unit 10 has no transmit capability, the unit cannot acknowledge the receipt of complete and accurate information. The remote unit 10 and the base station 40 thus employ devices to help ensure that accurate information is received. First, the transmission protocol employed must be robust and reliable and should incorporate techniques such as conventional bit-interleaving. The remote unit can also employ autonomous retransmission of data, i.e., the remote unit 10 automatically retransmits messages at a user-designated interval to ensure proper delivery.

In one embodiment, each transmission signal is assigned a unique identifier that is transmitted to the remote unit 10 along with the signal. Each time a transmission signal received at the remote unit 10 is deleted by the user, the remote unit saves the identifier in a received identifier record. The base station 40 also keeps track of which messages it attempted to send by reference to corresponding message identifiers. When the user returns to the base station, (e.g., office, or cell phone), the user is able to quickly determine whether the base station attempted to send messages that were not received by the remote unit 10 by comparing the identifiers in the received identifier record of the remote unit 10 with the message identifier list in the base station 40. After reconciliation, the received identifier record may be purged by the user or automatically by the system.

When a message is received, the remote unit 10 examines the identifier of the incoming transmission signal and compares it with the identifiers stored in the received identifier record. The remote unit 10 then examines a length field in the transmission to determine whether the remote unit 10 has enough available memory to store the signal. If the signal is a new transmission signal (i.e., the identifier of the incoming signal is not found in the received identifier record), and there is enough memory to store the message, the remote unit 10 records the message. An indicator on the display unit 20 is then turned on to indicate that a message is waiting. In one arrangement, the display unit 20 displays an icon indicative of the type of message received, so that the user can select the appropriate means to retrieve or play the message. If the signal is an old transmission signal (i.e., the identifier of the incoming signal matches an identifier stored in the received identifier record), the remote unit 10 rejects the message.

Signals received by the remote unit 10 are stored in the memory 18. The memory 18 may be dynamically allocated to different storage tasks in accordance with the operator customized data configuration scheme. The allocation can be directed by the user via the display control interface 20 of the remote unit 10 or by the display control unit 62 of the base station 40 in accordance with the operator customized data configuration and transmission scheme. For example, the user may allocate 60% of the memory to voice mail messages, 30% to SMS messages and 10% to calendar data, phone numbers and appointments. As messages are retrieved and deleted by the user, memory is freed to store other messages. Other information may be deleted according to the operator customized data configuration and retrieval scheme. For example, the user may specify that all appointments are to be deleted one hour after they are scheduled to take place.

In one embodiment, the transmission protocol includes a priority field that indicates the importance of the transmission signal. Message importance may be defined by the user through the base station control interface 62. For example, SMS messages from a particular sender may be given a high importance, while voice mail messages from another sender may be given a low importance. If the remote unit 10 does not have enough memory to store the incoming signal, the remote unit 10 checks the priority field of each of the messages already stored. The remote unit 10 examines whether enough memory will be free to store the incoming message if all stored messages having a lower priority are deleted. If so, the remote unit deletes, on a LIFO or FIFO basis as selected by the user, enough stored messages having a lower priority than the received message to permit storage of the received message.

In an alternative arrangement, the remote unit 10 does not receive voice mail messages; rather, the base station 40 notifies the remote unit 10 via a control signal that a voice mail message has been received. In response, an appropriate message or icon is displayed on the display unit 20 of the remote unit 10 to indicate that the message has been received.

The base station 40 is provided with means to accept and record messages, such as text (SMS) messages and voice mail messages. When a message is received by the base station 40, the base station determines which remote unit 10 the message is intended for and assigns the address to the transmission signal. The base station 40 next constructs a data record using the chosen transmission protocol and sends the message to the transmitter 52 for transmission. The transmitter encodes the message and converts it to an analog transmission signal that is transmitted over the antenna 54 to the remote unit 10. Various transmission parameters are controlled by the user through the control unit 62 in accordance with the operator customized data configuration and transmission scheme. These parameters may include the time of day that messages are transmitted, the maximum message length, the maximum number of messages to transmit, the message repeat interval, whether the message is to be compressed and/or encrypted and the like. The transmission protocol may also contain information regarding the length of messages so that the remote unit 10 knows when to stop recording.

Figure 6:
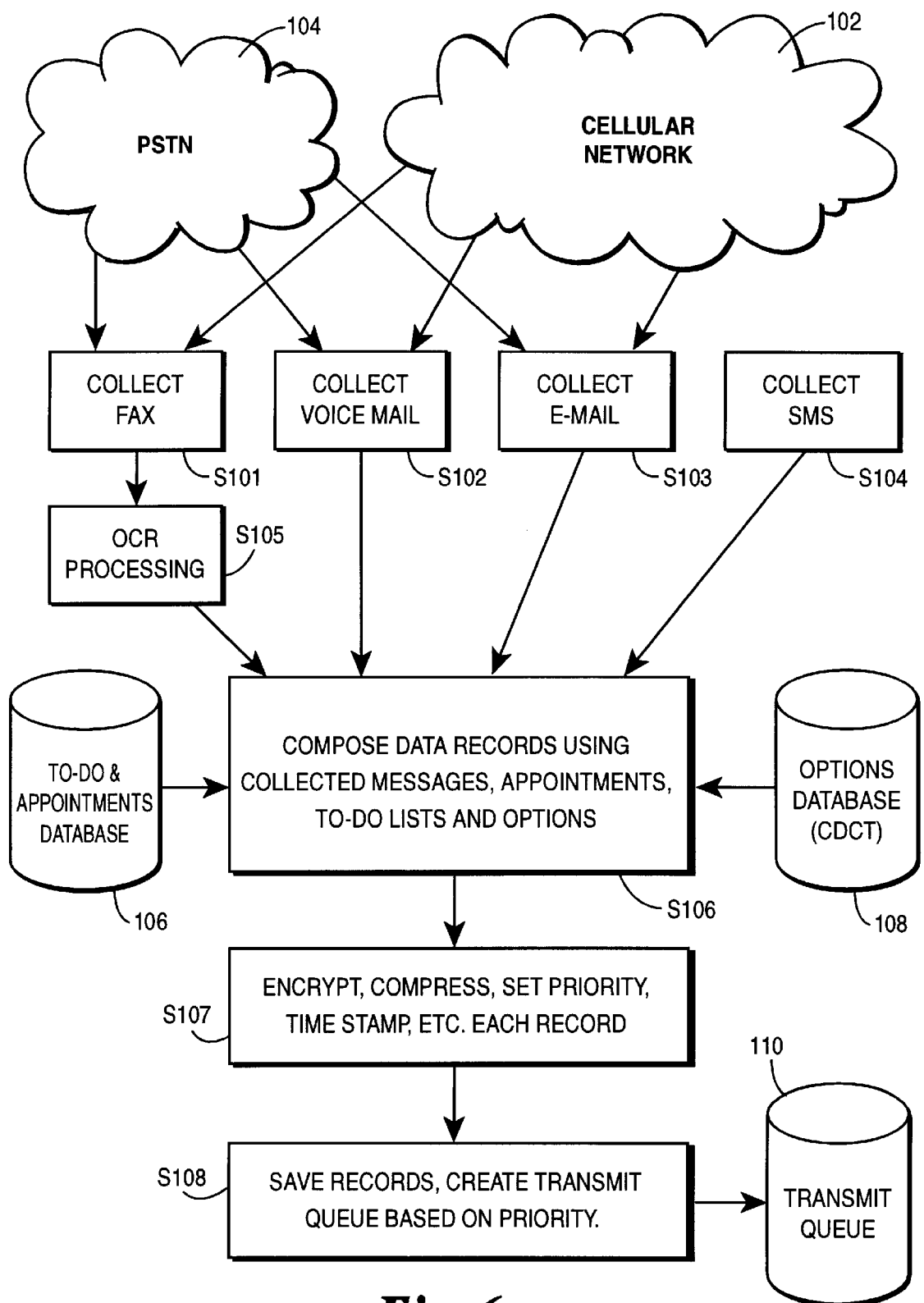
FIG. 6 is a flow chart illustrating an exemplary base station message collection process.

An exemplary operation according to the present invention will be described with reference to FIGS. 6–8. FIG. 6 is a flow chart illustrating an exemplary base station message collection process. As noted above, the base station 40 can be embodied in a PC-type implementation, or may be implemented in a cellular radio telephone or the like. As shown in FIG. 6, the base station communicates via a cellular network 102 or a public switched telephone network (PSTN) 104. In this context, the base station according to conventional technology collects fax data, voice mail data, E-mail data, and in conjunction with the cellular network SMS messages (steps S101–S104, respectively). Instep S105, the fax data is processed via OCR processing, and in step S106, the data records are composed for transmission. Also input for transmission may be data from a personal database 106 and an options database 108, including the operator customized data configuration and transmission scheme (CDCT scheme).

In step SI 07, the data records are processed in accordance with the CDCT scheme including, for example, encrypt, compress, set priority, time stamp and the like functions. The processed records are saved in step S108 and forwarded to a transmit queue 110.

Figure 7:
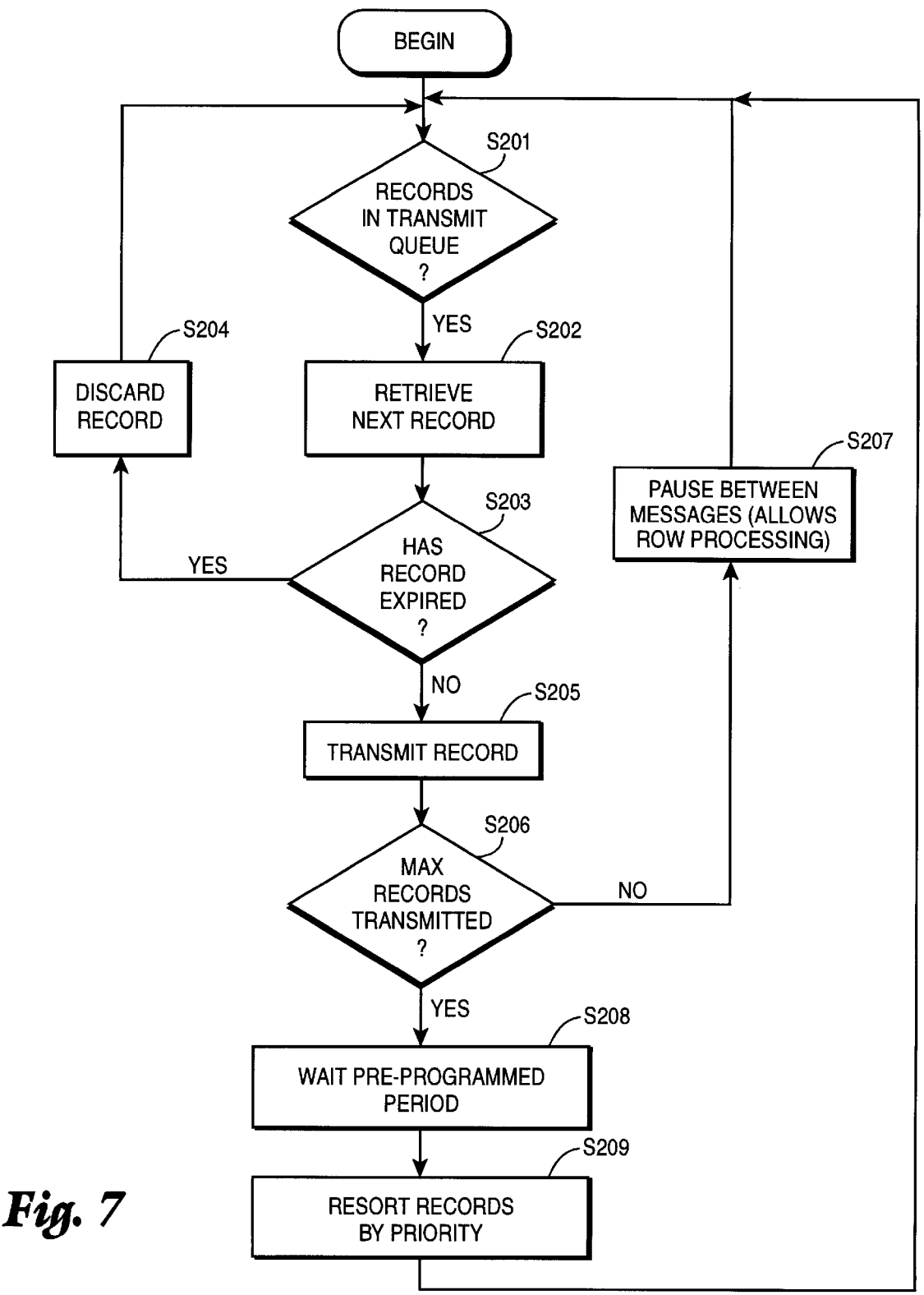
FIG. 7 is a flow chart illustrating an exemplary base station data record transmission process.

An exemplary base station data record transmission process is illustrated in FIG. 7. In step S201, the system determines whether there are records for transmission in the transmit queue 110. If not, (NO in step S201), the system loops the process back until a record is stored in the transmit queue. If there are records in the transmit queue (YES in step S201), the next record is retrieved in step S202. Based on the time stamp and other characteristics in accordance with the CDCT scheme, the system determines whether the record has expired (step S203), and if so, the record is discarded (step S204). If not, the record is transmitted to the remote unit in step S205. The system then determines in step S206 whether a maximum number of records have been transmitted in accordance with the CDCT scheme. If not, in step S207, the system pauses between messages to allow for row processing, and the operation returns to step S201. If the maximum records have been transmitted (YES in step S206) based on memory capability and the like, after waiting a pre-programmed period (step S208), the records are resorted by priority in step S209 in accordance with the CDCT scheme. The operation then returns to step S201.

Figure 8:
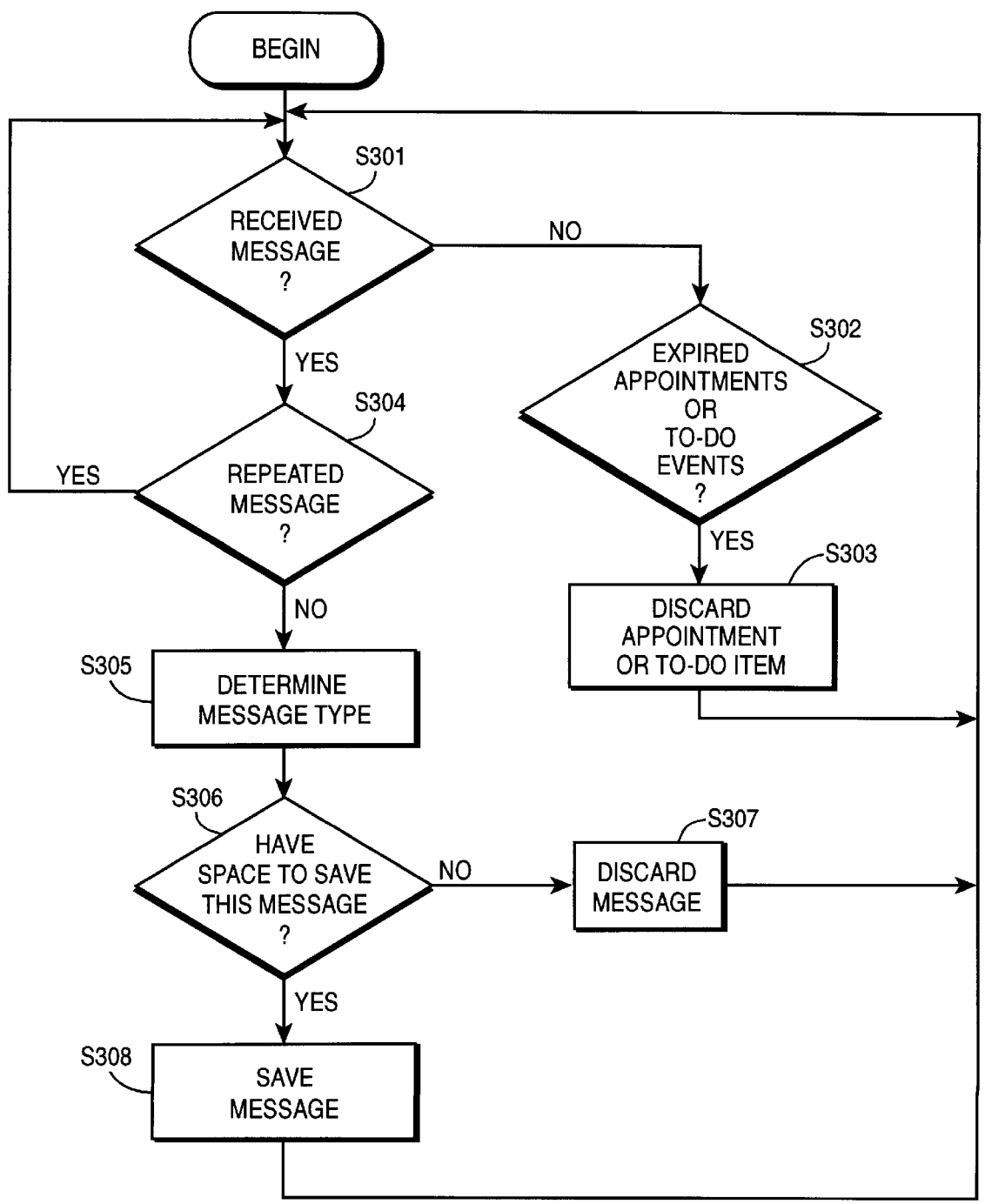
FIG. 8 is a flow chart illustrating an exemplary remote unit message reception/processing operation.

FIG. 8 illustrates an exemplary process for remote unit message reception/processing. The handling and processing of incoming messages is performed in accordance with the operator customized data configuration and retrieval scheme (CDCR scheme). In step S301, the remote unit determines whether a message has been received. If not, the remote unit checks whether it is storing data relating to expired personal data such as appointments or to do events (step S302). If so, this data is expired in step S303, and if not, the operation returns to step S301.

If a message has been received (YES in step S301), the remote unit determines whether the message is a repeated message, for example, by comparing the identifier of the incoming signal with an identifier stored in the received identifier record or the remote unit (step S304). If so, the message is discarded. If not, the remote unit determines the message type in step S305 and determines whether there is space available to store this message in step S306. If not, the message may be discarded (step S307), and if so, the message is saved in step S308. The operation then returns to step S301.

In accordance with the present invention, a communications system is provided that serves as an extension of a user's personal communication technology. The system includes a base station, which could be the user's cellular phone or PC or the like, and a remote receive-only communication unit that is programmed in accordance with an operator customized data configuration and retrieval scheme enabling customized messaging in a portable remote device. In preferred forms, the remote communication unit forms part of a wristwatch for maximum portability.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A remote receive-only communication unit for storing and receiving personal data from a user-configured and controlled base station according to an operator customized data configuration and transmission scheme, the unit comprising:

a receiver having an antenna;

a processor communicating with said receiver and processing a transmission signal from the user-configured and controlled base station according to the operator customized data configuration and transmission scheme received by said receiver;

a memory communicating with said processor and storing said personal data, said memory further storing a control program and data corresponding to said transmission signal received by said receiver, said control program controlling an operation of said processor; and a display interface unit communicating with said processor, said display interface unit including at least one user interface element that enables an operator to interface with said processor, wherein said processor is programmed to access and control said receiver, said memory and said display interface in accordance with an operator customized data configuration and retrieval scheme, said display interface unit further including a display that selectively displays at least one of said personal data and said data corresponding to said transmission signal in accordance with said operator customized data configuration and retrieval scheme, wherein the operator customized data configuration and transmission scheme and the operator customized data configuration and retrieval scheme effect customization of (1) a manner in which said personal data and said data corresponding to said transmission signal are transferred to the remote receive-only communication unit and (2) a content of said personal data and said data corresponding to said transmission signal.

2. A remote receive-only communication unit according to claim 1, further comprising:

a band pass filter operatively cooperating with said antenna, said band pass filter band pass filtering the transmission signal;

an amplifier operatively cooperating with said antenna and said band pass filter, said amplifier amplifying the transmission signal; and a detector receiving the amplified transmission signal and outputting demodulated data to said processor.

3. A remote receive-only communication unit according to claim 2, wherein said detector is one of an amplitude modulation detector or a frequency modulation discriminator.

4. A remote receive-only communication unit according to claim 1, further comprising:

a first band pass filter having a first width and operatively cooperating with said antenna, said band pass filter band pass filtering the transmission signal;

an amplifier operatively cooperating with said antenna and said first band pass filter, said amplifier amplifying the transmission signal;

a local oscillator receiving the amplified transmission signal and outputting a modulated intermediate frequency (IF) signal;

a second band pass filter having a second width narrower than said first width and operatively cooperating with said local oscillator, said second band pass filter band pass filtering the IF signal; and a detector receiving the transmission signal and outputting demodulated data to said processor.

5. A remote receive-only communication unit according to claim 4, wherein said second band pass filter is a channel filter.

6. A remote receive-only communication unit according to claim 4, wherein said detector is one of an amplitude modulation detector or a frequency modulation discriminator.

7. A remote receive-only communication unit according to claim 1, wherein said processor defines an address for the unit, and wherein said transmission signal comprises a transmission address identifying an intended recipient address, said processor comparing the unit address and the transmission address.

8. A remote receive-only communication unit according to claim 1, wherein said processor implementing said operator customized data configuration and retrieval scheme comprises structure for prioritizing multiple ones of said transmission signal, said transmission signal comprising a prioritization code.

9. A remote receive-only communication unit according to claim 1, wherein said memory is allocated to different storage tasks.

10. A method of operating a remote receive-only communication unit for storing and receiving personal data from a user-configured and controlled base station according to an operator customized data configuration and transmission scheme, the unit including a receiver having an antenna, a processor communicating with the receiver, a memory communicating with the processor and storing a control program controlling an operation of the processor, and a display interface unit communicating with the processor and having at least one user interface element that enables an operator to interface with the processor, the method comprising:

(a) receiving a transmission signal from the user-configured and controlled base station according to the operator customized data configuration and transmission scheme;

(b) processing the transmission signal in accordance with an operator customized data configuration and retrieval scheme;

(c) storing the processed transmission signal in the memory in accordance with the retrieval scheme; and (d) accessing and controlling the receiver, the memory and the display interface in accordance with the retrieval scheme, wherein the operator customized data configuration and transmission scheme and the operator customized data configuration and retrieval scheme effect customization of (1) a manner in which the personal data and the data corresponding to the transmission signal are transferred to the remote receive-only communication unit and (2) a content of the personal data and the data corresponding to the transmission signal.

11. A method according to claim 10, wherein the transmission signal comprises a transmission address identifying an intended recipient address, and wherein step (b) is practiced by defining an address for the unit and comparing the unit address and the transmission address.

12. A method according to claim 10, wherein the transmission signal includes a prioritization code, and wherein step (d) is practiced by (e) prioritizing multiple ones of the transmission signal.

13. A method according to claim 12, wherein step (e) is practiced by prioritizing the multiple ones of the transmission signal based on a type of the signal.

14. A method according to claim 12, wherein step (e) is practiced by prioritizing the multiple ones of the transmission signal based on a source of the signal.

15. A method according to claim 12, wherein the transmission signal includes a length field, the method further comprising determining whether the unit has enough memory to store an incoming transmission signal based on the length field and deleting lower priority transmission signals if the unit does not have enough memory and the incoming transmission signal has a higher priority.

16. A method according to claim 10, further comprising allocating the memory to different storage tasks.

17. A method of operating a remote receive-only communication unit for storing and receiving personal data, the unit including a receiver having an antenna, a processor communicating with the receiver, a memory communicating with the processor and storing a control program controlling an operation of the processor, and a display interface unit communicating with the processor and having at least one user interface element that enables an operator to interface with the processor, the method comprising:

(a) receiving a transmission signal from a base station;
(b) processing the transmission signal in accordance with an operator customized data configuration and retrieval scheme;
(c) storing the processed transmission signal in the memory in accordance with the scheme; and
(d) accessing and controlling the receiver, the memory and the display interface in accordance with the scheme, wherein the transmission signal includes a signal identifier, and wherein step (d) is practiced by storing the signal identifier when the transmission signal is deleted.

18. A method according to claim 17, wherein step (d) is further practiced by comparing the signal identifier of an incoming transmission signal with the stored signal identifiers and discarding repeated transmission signals that have been deleted.

19. A data and message retrieval communication system comprising:

a user-configured and controlled base station including a transmitter that transmits a transmission signal according to an operator customized data configuration and transmission scheme; and
a remote receive-only communication unit, the unit including:
a receiver having an antenna,
a processor communicating with said receiver and processing said transmission signal from said user-configured and controlled base station according to the operator customized data configuration and transmission scheme received by said receiver,
a memory communicating with said processor and storing personal data, a control program, and data corresponding to said transmission signal received by said receiver, said control program controlling an operation of said processor, and
a display interface unit communicating with said processor, said display interface unit including at least one user interface element that enables an operator to interface with said processor, wherein said processor is programmed to access and control said receiver, said memory and said display interface in accordance with an operator customized data configuration and retrieval scheme, said display interface unit further including a display that selectively displays at least one of said personal data and said data corresponding to said transmission signal in accordance with said operator customized data configuration and retrieval scheme,
wherein the operator customized data configuration and transmission scheme and the operator customized data configuration and retrieval scheme effect customization of (1) a manner in which said personal data and said data corresponding to said transmission signal are transferred to the remote receive-only communication unit and (2) a content of said personal data and said data corresponding to said transmission signal.

20. A data message and retrieval communication system according to claim 19, wherein said base station comprises structure enabling said base station to communicate with multiple ones of said remote receive-only communication unit.

21. A data message and retrieval communication system according to claim 20, wherein said transmitter attaches an address to said transmission signal designating an intended remote receive-only communication unit recipient, wherein said processor defines an address for the unit, said processor comparing the unit address and the transmission address.

22. A data message and retrieval communication system according to claim 19, wherein said base station comprises structure that designates a priority for multiple ones of the transmission signal.

23. A data message and retrieval communication system according to claim 22, wherein said structure that designates a priority prioritizes the multiple ones of the transmission signal based on a type of the signal.

24. A data message and retrieval communication system according to claim 22, wherein said structure that designates a priority prioritizes the multiple ones of the transmission signal based on a source of the signal.

25. A method of operating a data and message retrieval communication system including a user-configured and controlled base station having a transmitter that transmits a transmission signal, and a remote receive-only communication unit for storing and receiving personal data, the unit including a receiver having an antenna, a processor communicating with the receiver, a memory communicating with the processor and storing a control program controlling an operation of the processor, and a display interface unit communicating with the processor and having at least one user interface element that enables an operator to interface with the processor, the method comprising:

(a) transmitting a transmission signal in accordance with an operator customized data configuration and transmission scheme (CDCT scheme);
(b) receiving the transmission signal from the base station;
(c) processing the transmission in accordance with an operator customized data configuration and retrieval scheme (CDCR scheme);
(d) storing the processed transmission signal in the memory in accordance with the CDCR scheme; and
(e) accessing and controlling the receiver, the memory and the display interface in accordance with the CDCR scheme, wherein the operator customized data configuration and transmission scheme and the operator customized data configuration and retrieval scheme effect customization of (1) a manner in which the personal data and the data corresponding to the transmission signal are transferred to the remote receive-only communication unit and (2) a content of the personal data and the data corresponding to the transmission signal.

26. A method according to claim 25, wherein the base station includes a timing circuit, and wherein step (a) is practiced by timing the transmitting of the transmission signal in accordance with the CDCT scheme.

27. A method according to claim 25, further comprising, prior to step (a), attaching an address to the transmission signal designating an intended remote receive-only communication unit recipient, wherein step (c) comprises defining an address for the unit and comparing the unit address and the transmission address.

28. A method according to claim 25, further comprising, prior to step (a), designating a priority for multiple ones of the transmission signal.

29. A method according to claim 28, wherein said designating comprises prioritizing the multiple ones of the transmission signal based on a type of the signal.

30. A method according to claim 28, wherein said designating comprises prioritizing the multiple ones of the transmission signal based on a source of the signal.

31. A method according to claim 25, further comprising, prior to step (a), assigning a signal identifier to the transmission signal and storing the signal identifier.

32. A method according to claim 25, wherein step (a) is practiced by receiving a message from an external source, determining an address for the remote receive-only communication unit and assigning a transmission identifier to the message, constructing a data record using a predetermined transmission protocol, sending the message to the transmitter, and encoding the message and converting the message into the transmission signal.

33. A method according to claim 25, wherein step (a) is practiced by setting at least one of time of transmission, maximum message length, maximum number of messages to transmit, a message repeat interval, and encryption and compression data in accordance with the CDCT scheme.

* * * * *